United States Patent
McCoy, Jr. et al.

(10) Patent No.: US 6,267,037 B1
(45) Date of Patent: Jul. 31, 2001

(54) PIPELINE CUTTING APPARATUS

(75) Inventors: Richard W. McCoy, Jr.; Luis J. Gutlerrez, both of Houston, TX (US)

(73) Assignee: Oceaneering International, Inc., Houston, TX (US)

(*) Notice: Subject to any disclaimer, the term of this patent is extended or adjusted under 35 U.S.C. 154(b) by 0 days.

(21) Appl. No.: 09/338,402

(22) Filed: Jun. 22, 1999

(51) Int. Cl.$^7$ ............................................. B26D 5/00
(52) U.S. Cl. ................... 83/745; 83/796; 83/797; 83/798; 83/810; 83/820; 83/917
(58) Field of Search ................... 83/745, 743, 54, 83/796, 820, 946, 794, 797, 798, 809, 810, 661, 917; 451/310, 439; 29/890.031, 402.03, 402.06

(56) References Cited

U.S. PATENT DOCUMENTS

| | | | |
|---|---|---|---|
| H45 | 4/1986 | Gilmore | 30/94 |
| 1,689,829 | 10/1928 | Heintz | 451/304 |
| 2,150,381 | 3/1939 | Lansing | 125/21 |
| 2,408,517 | * 10/1946 | Howard | 33/21.3 |
| 2,509,698 | * 5/1950 | Rudisell | 33/21.3 |
| 2,674,238 | 4/1954 | Dessureau et al. | 125/21 |
| 2,762,621 | 9/1956 | Zumwalt | 266/54 |
| 2,795,222 | 6/1957 | Garrison | 125/21 |
| 3,056,267 | 10/1962 | McRee | 405/91 |
| 3,464,685 | * 9/1969 | Schreib | 266/56 |
| 3,479,830 | 11/1969 | Ostarly | 405/172 |
| 3,578,233 | 5/1971 | Meister et al. | 228/5.1 |
| 4,007,705 | 2/1977 | Sherer et al. | 118/710 |
| 4,091,514 | 5/1978 | Motes-Conners et al. | 29/33 T |
| 4,109,480 | 8/1978 | Sumner | 405/173 |
| 4,143,862 | 3/1979 | Krieg | 266/56 |
| 4,213,357 | * 7/1980 | Lively et al. | 82/113 |
| 4,312,498 | 1/1982 | Whiteside | 266/56 |
| 4,765,307 | 8/1988 | Kubo | 125/21 |
| 4,777,723 | 10/1988 | Southoff | 30/97 |
| 4,787,363 | 11/1988 | Kubo | 125/21 |
| 4,936,284 | 6/1990 | Johnson | 125/21 |
| 5,010,694 | 4/1991 | Agbede | 451/38 |
| 5,361,748 | 11/1994 | Matteucci | 125/21 |
| 5,598,754 | 2/1997 | Robinson | 82/47 |
| 5,685,996 | 11/1997 | Ricci | 219/121.39 |

FOREIGN PATENT DOCUMENTS

| | | | |
|---|---|---|---|
| 540834A1 | 5/1993 | (EP) | 125/21 |
| 777146 | 11/1980 | (SU) | 405/195.1 |

* cited by examiner

Primary Examiner—M. Rachuba
(74) Attorney, Agent, or Firm—Duane, Morris & Heckscher LLP

(57) ABSTRACT

An underwater apparatus for servicing subsea pipelines provides a telescoping frame which can be lowered to the vicinity of the pipeline. The frame has an open section so that it can straddle the pipeline and outer jacket and fixate itself releasably so that it can be selectively repositioned. A cutting apparatus is secured to a telescoping sub frame. The cutting structure can be rotated about the longitudinal axis of the sub frame, as well as advanced along the direction of the longitudinal axis of the frame due to the telescoping feature of the sub frame. The cutting structure can also be moved pivotally about an axis of rotation which is outside and generally perpendicular to the longitudinal axis of the pipe. Thus, combining the telescoping feature with the pivoting feature and the feature of being able to rotate about the longitudinal axis, a variety of different cuts can be made. The principal advantage of the apparatus is to be able to cut through an outer jacket of a jacketed pipeline transversely and longitudinally to remove it in pieces without cutting through the pipeline.

13 Claims, 6 Drawing Sheets

US 6,267,037 B1

PIPELINE CUTTING APPARATUS

FIELD OF THE INVENTION

The field of this invention relates to an apparatus which can be employed subsea to cut an outer jacket off of a subsea pipeline for access to the pipeline for repairs or, alternatively, the apparatus can cut through a pipe and its jacket or a bare pipe.

BACKGROUND OF THE INVENTION

Pipelines run subsea occasionally require repairs. In many installations, the pipeline is jacketed with a concentric jacket which leaves an annular space between the pipeline and the outside of the jacket. In the past, in order to service such pipelines using known subsea cutting devices, the entire pipeline had to be severed by a cutting apparatus. Generally, these devices would be lowered to the pipeline and use a frame-supported diamond wire as the cutting mechanism. The devices of the prior art oriented the diamond wire to make a cut perpendicular to the longitudinal axis of the pipeline, through the pipeline and the surrounding jacket. This step would be repeated at another location so that an entire segment, which is thought to have a leak, can be removed and replaced.

The devices previously known did not have the capability of cutting away the outer jacket without also cutting through the pipe. An advantage that is obtained from the present invention, which has the capability of independently cutting the outer jacket without cutting through the pipe, is that the pipeline can be exposed to confirm the precise location of any leak and to, perhaps, make any repairs without having to needlessly remove a complete section of the pipeline. The present invention is not limited to cuts in a single plane transverse to the longitudinal axis of the pipe. As a result, a multiplanar cut can reduce binding on the cutter since the cut piece remains in place at the end of the cut.

Typical of cutting devices available in the prior art are U.S. Pat. Nos. 5,685,996; 5,598,754; 5,361,748; 5,010,694; 4,777,723; 4,312,498; 4,143,862; 4,091,514; 3,578,233; 3,056,267; 2,762,621; U.S. Statutory Invention Registration H-45; European application 0540834A1; Russian patents 777146; 659,687; 150,377; and Japanese patent 2-59273. Yet other patents deal with cutting devices generally and components therefor, whether such devices are used subsea or to cut other structures. Typical of such devices are U.S. Pat. Nos. 4,936,284; 4,765,307; 4,007,705; 3,479,830; 2,795,222; 2,674,238; and 1,689,829. U.S. Pat. No. 4,109,480 shows an underwater crane that can be used for repair of pipelines underwater.

None of these prior art devices have the capability of selectively removing an outer jacket from a covered subsea pipeline, coupled with the versatility of being able to cut perpendicular to the longitudinal axis or in a multiplicity of planes if, for any reason, a section has to be severed from the pipeline for repair. One of the objects of the present invention is to provide a device which can be economical to build and which works efficiently to give flexibility to make a variety of different types of cuts to address any particular subsea situation. Another object of the device is to be able to remove a section of an outer jacket without cutting the actual pipeline to provide access to the pipeline for analysis of the location of a trouble spot and for possibly effecting a repair without cutting through the pipeline. These and other advantages of the apparatus of the present invention will become more apparent from a review of the detailed description below.

SUMMARY OF THE INVENTION

An underwater apparatus for servicing subsea pipelines provides a telescoping frame which can be lowered to the vicinity of the pipeline. The frame has an open section so that it can straddle the pipeline and outer jacket and fixate itself releasably so that it can be selectively repositioned. A cutting apparatus is secured to a telescoping sub frame. The cutting structure can be rotated about the longitudinal axis of the sub frame, as well as advanced along the direction of the longitudinal axis of the frame due to the telescoping feature of the sub frame. The cutting structure can also be moved pivotally about an axis of rotation which is outside and generally perpendicular to the longitudinal axis of the pipe. Thus, combining the telescoping feature with the pivoting feature and the feature of being able to rotate about the longitudinal axis, a variety of different cuts can be made. The principal advantage of the apparatus is to be able to cut through an outer jacket of a jacketed pipeline transversely and longitudinally to remove it in pieces without cutting through the pipeline.

DETAILED DESCRIPTION OF THE PREFERRED EMBODIMENT

Figure 1:
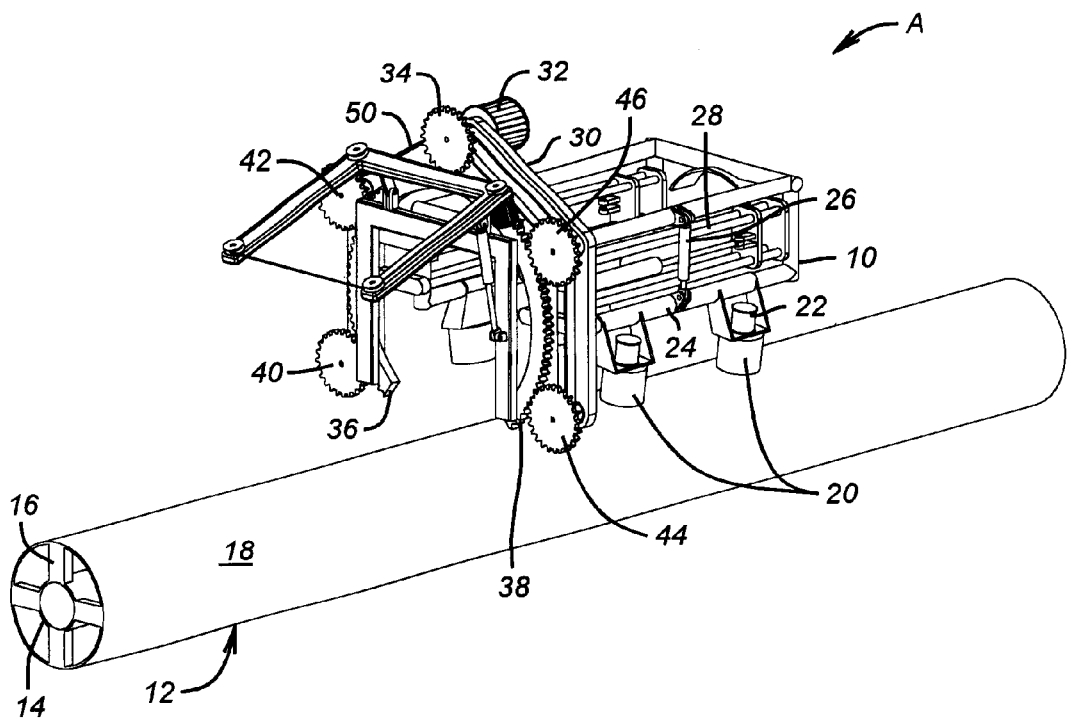
FIG. 1 shows the apparatus being lowered to a pipeline.

The apparatus A is shown in FIG. 1 in the position that it would take as it is being lowered from a surface vessel, employing the crane mounted on such a vessel. The supporting cables and hydraulic lines from the vessel crane to the apparatus A are not shown for clarity in understanding the invention. The apparatus A contains a base frame 10. Base frame 10 is a U-shaped structure having an open bottom so that the apparatus A can be lowered onto a jacketed pipeline 12. The jacketed pipeline 12 is an assembly of the actual pipeline 14, which through a series of extending supports 16, located periodically along its longitudinal axis, supports the outer jacket 18. The jacketed pipeline may have to be lifted before the base frame 10 can straddle it.

Figure 2:
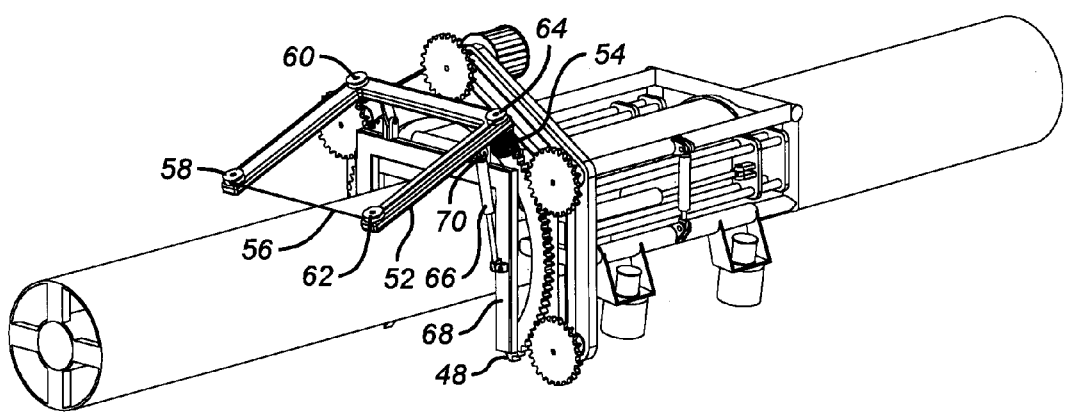
FIG. 2 shows the apparatus settled on the pipeline.
Figure 3:
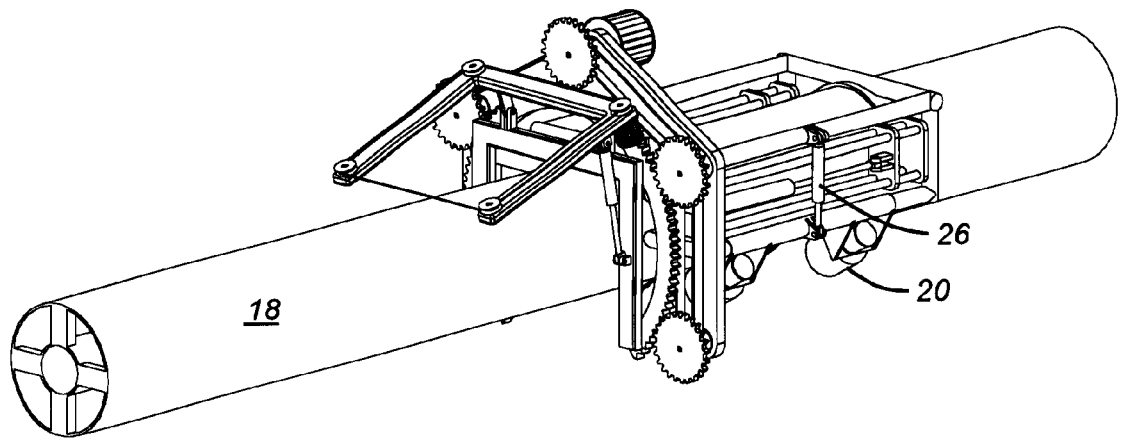
FIG. 3 shows the frame of the apparatus secured to the outer jacket on the pipeline.

The base frame 10 includes a plurality of drive rollers 20, each of which is motorized by a motor 22. The rollers 20 are shown on one side of the base frame 10 and a mirror image arrangement occurs on the opposite side, which is not shown in the drawing of FIG. 1. A movable bar 24 is connected to an actuator 26 such that extension of a piston out of the cylinder in actuator 26 results in rotational movement of movable bar 24 to move the rollers 20 from the position shown in FIGS. 1 and 2 to the position shown in FIG. 3. With the piston extended from the cylinder in actuator 26, as shown in FIG. 3, the rollers 20 have moved under the jacket 18 to secure the position of base frame 10 to the jacket 18. The drive rollers 20, motor 22, and moveable bar 24, serve as a clamping and crawling mechanism that is capable of clamping the sub frame to a jacket and is further capable of allowing the apparatus frame and the sub frame to crawl along a jacket to which the apparatus frame is securable.

Figure 8:
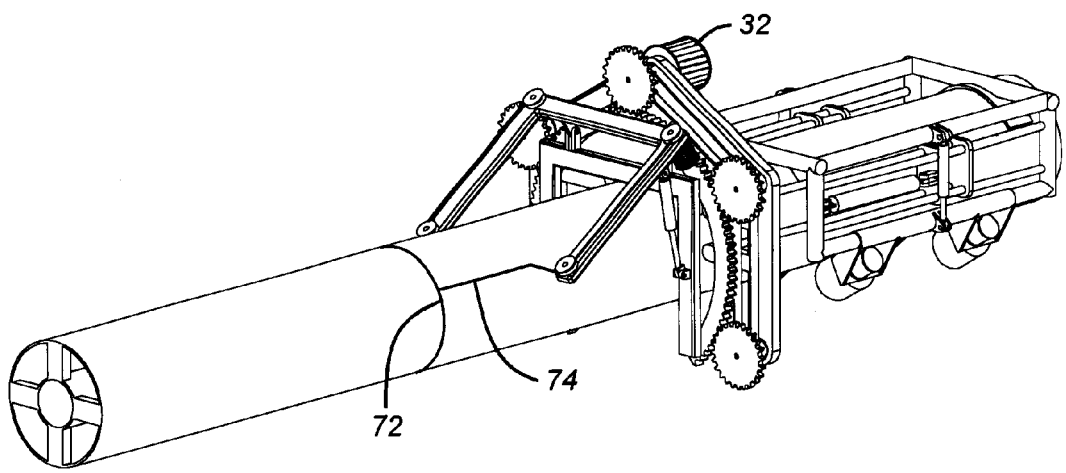
FIG. 8 shows the frame relocated with respect to the initial cut in the jacket and the progression of a longitudinal cut from the initial cut through the outer jacket.

Those skilled in the art will appreciate that a similar layout occurs on the backside of the base frame 10 so that the rollers 20 essentially are pivoted to a position under the jacket 18 (or the bare pipeline 14) to secure the position of base frame 10 until it is desired to move the base frame 10 by driving rollers 20, as illustrated in FIG. 8.

Base frame 10 has within it telescoping sub frame 28. Sub frame 28 is shown in FIG. 1 nested within base frame 10 but can be actuated to extend with respect to base frame 10 as shown in FIG. 8. Sub frame 28 supports sprocket frame 30. A drive motor 32 operates sprocket 34. Rotationally mounted to the sub frame 28 is open gear 36, which is generally U-shaped and has a series of exterior teeth 38. Sprocket 34 meshes with teeth 38 so that operation of motor 32 will rotate open gear 36 about the longitudinal axis of the jacketed pipeline 12, as shown, for example, by comparing FIG. 1 to FIGS. 5 and 6. Sprockets 40, 42, 44, and 46 are supported by sprocket frame 30, with each having teeth to mesh with teeth 38. The driving is done directly through sprocket 34 and through a belt 50 using sprockets 40, 42, 44, and 46, while the open gear 36 is longitudinally retained to prevent its movement so as to keep sprocket 34 meshed with teeth 38 as rotation in either direction, clockwise or counterclockwise, can be accomplished with respect to the longitudinal axis of the jacketed pipeline 12. Those skilled in the art will appreciate that a complete 360° cut can be accomplished as the open gear 36 can continue to be rotated, even though one of the sprockets 40 or 44 loses contact with the teeth 38. This can be seen by looking at FIG. 6 where open gear 36 has been rotated to the point where sprocket 42 is no longer in contact with open gear 36. However, the other sprockets still can continue to drive open gear 36. FIG. 6 represents an extreme position in one direction for the open gear 36 with respect to sprocket 34. The other extreme position can be reached when end 48 of open gear 36 comes near sprocket 34. This position is not shown in the figures. The cut is made by rotating the open gear 36 clockwise for a little over 180° and then reversing and rotating counterclockwise for a little over 360° to complete the cut. Continuous rotation in one direction, while possible, could tangle up the hydraulic cables.

Also shown in FIG. 1 is a continuous belt 50 which can be used off motor 32 to power the sprockets 40, 42, 44, and 46, as opposed to leaving them as idlers and powering the open gear 36 strictly from sprocket 34.

Also secured to open gear 36 for tandem movement therewith is wire cutter frame 52, which has a drive motor 54 which powers a diamond wire 56 along a series of pulleys 58, 60, 62 and 64. An actuator 66 mounted on opposing sides of the wire cutter frame 52 and the open gear frame 68 allows for pivotal movement of wire cutter frame 52 with respect to pivots 70 on the open gear frame 68. Pivots 70 define an axis generally perpendicular to the longitudinal axis of the pipeline 14 to define an arcuate movement of wire 56 toward or away from the pipeline 14 or jacket 18.

The essential components of the apparatus A having been described, the sequence of operation for removing a section of the outer jacket 18 without cutting the pipeline 14 using the figures will be described. As has previously been explained, the apparatus A is lowered over the jacketed pipeline 12 and the rollers 20 are moved on either side of base frame 10 by virtue of operation of actuator 26. The apparatus A is now secured to the outer jacket 18 by rollers 20, as shown in FIG. 3.

Figure 4:
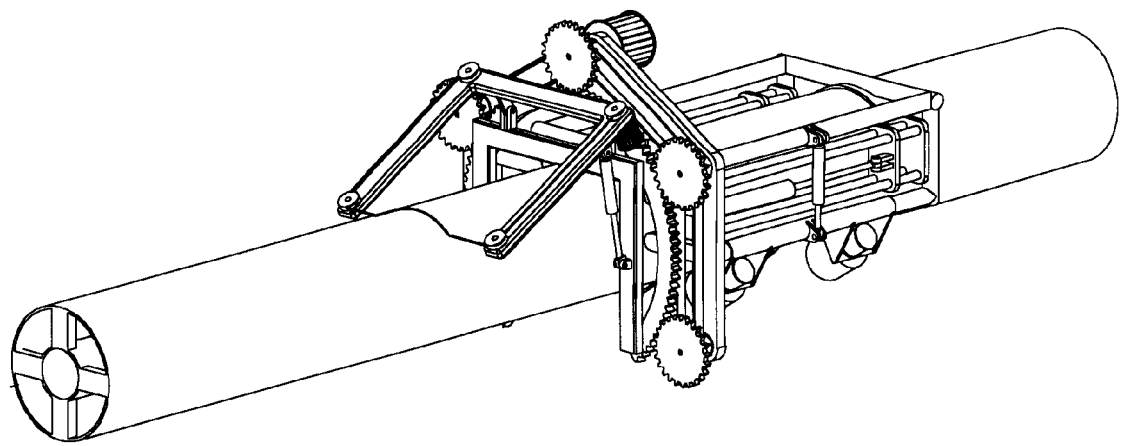
FIG. 4 shows the initiation of a cut through the jacket.
Figure 5:
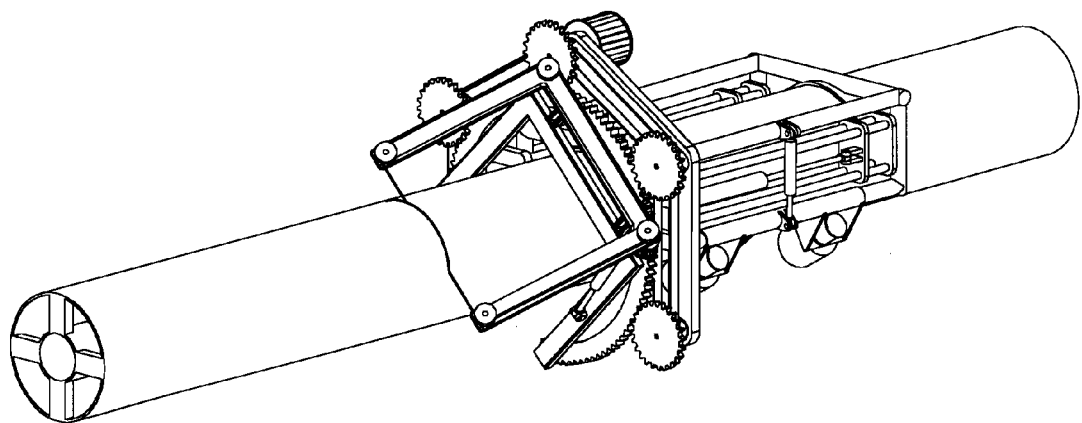
FIG. 5 is the view of FIG. 4, with the cutting structure rotated with respect to the longitudinal axis of the pipeline.
Figure 6:
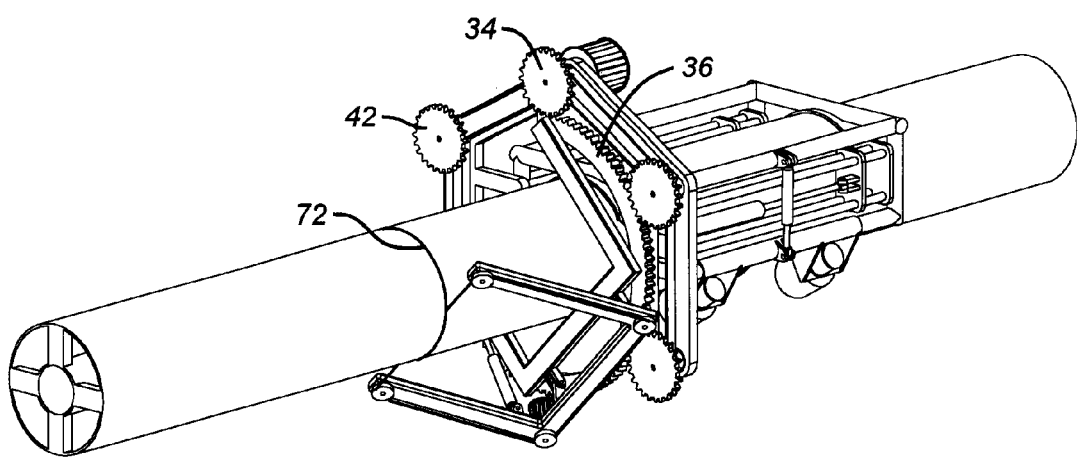
FIG. 6 is the view of FIG. 5, showing the completion of an initial cut through the jacket of the pipeline.

As shown in FIGS. 4 and 5, the wire cutter frame 52 is at pivots 70 in an arcuate path rotated downwardly into contact with the outer jacket 18. The pivotal motion of wire cutter frame 52 can be combined with the translational motion of the sub frame 28 with respect to base frame 10 so that the movement of wire 56 is purely perpendicular to the longitudinal axis of the jacketed pipeline 12. Alternatively, the wire 56 can be advanced on an arcuate path by rotation of frame 52 to the point where a short chord is made by wire 56 as it penetrates through the wall of the outer jacket 18. The wire 56 is rotated either continuously or sporadically to finish the cut. Thereafter, as shown in FIGS. 5 and 6, motor 32 is actuated to turn in one or two directions to complete a cut through the outer jacket 18. Again, when this process is going on, as illustrated in FIGS. 5 and 6, it can be combined with longitudinal motion of the sub frame 28 with respect to the base frame 10 so that the entire cut all the way around the outer jacket 18 is in a plane perpendicular to the longitudinal axis of the jacketed pipeline 12. However, it is not mandatory that the initial cut illustrated in FIGS. 5 and 6 be in the single plane. In fact, it may be preferable to have the cut in more than one plane such as when the cut 72 is undulating or curved. The advantage of cutting the outer jacket 18 outside of a single plane perpendicular to the longitudinal axis of the jacketed pipeline 12 is that at the conclusion of the cut, the stresses in the outer jacket 18 will not pinch or bind the wire 56 because the two cut segments of the outer jacket 18 will remain in place until the second cut is made, as well as a longitudinal cut so that two sections of the outer jacket 18 can be taken off the pipeline 14.

Figure 7:
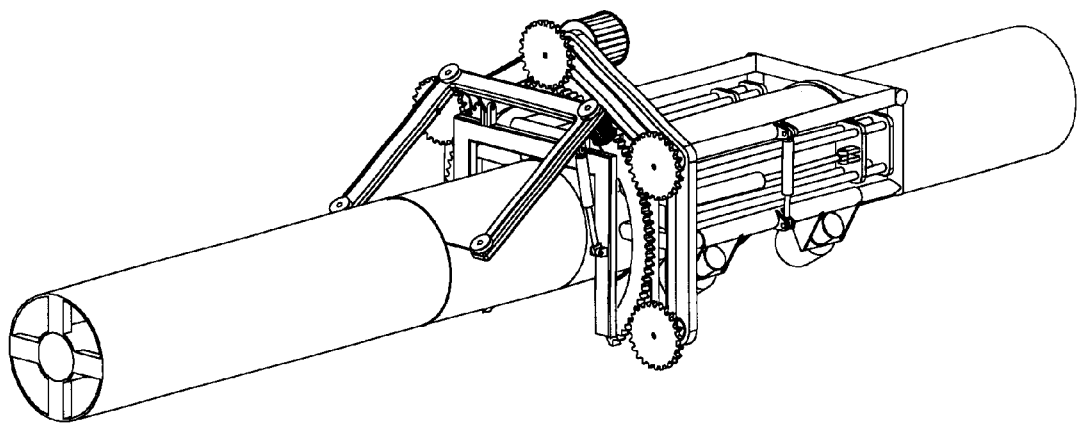
FIG. 7 is the view of FIG. 6, showing the completion of the initial cut in the jacket.
Figure 9:
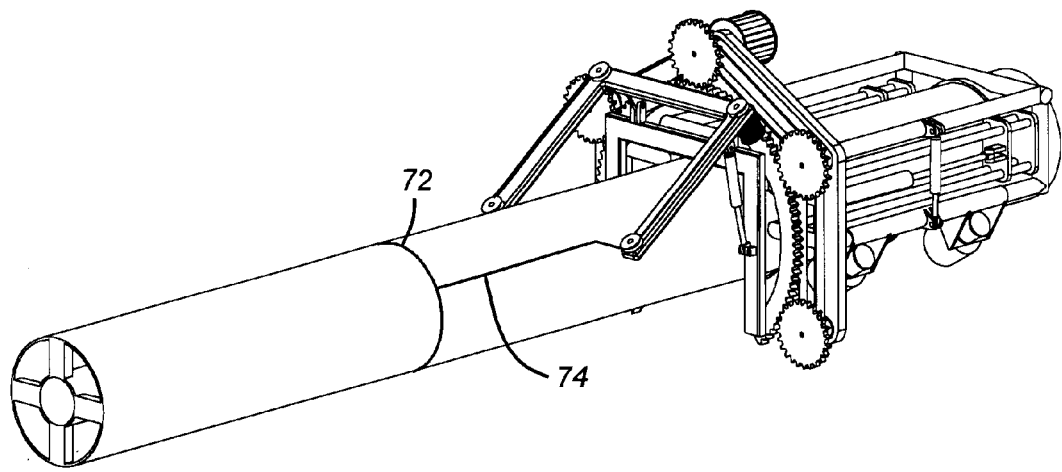
FIG. 9 shows the conclusion of the longitudinal cut in the outer jacket.
Figure 10:
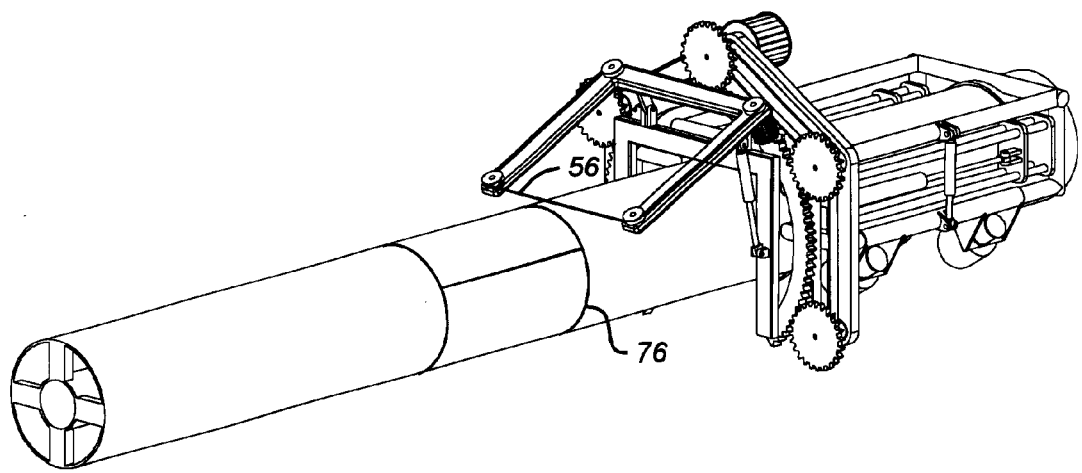
FIG. 10 shows the cutting structure removed from the outer jacket at the conclusion of a second cut perpendicular to the longitudinal axis of the jacket.
Figure 11:
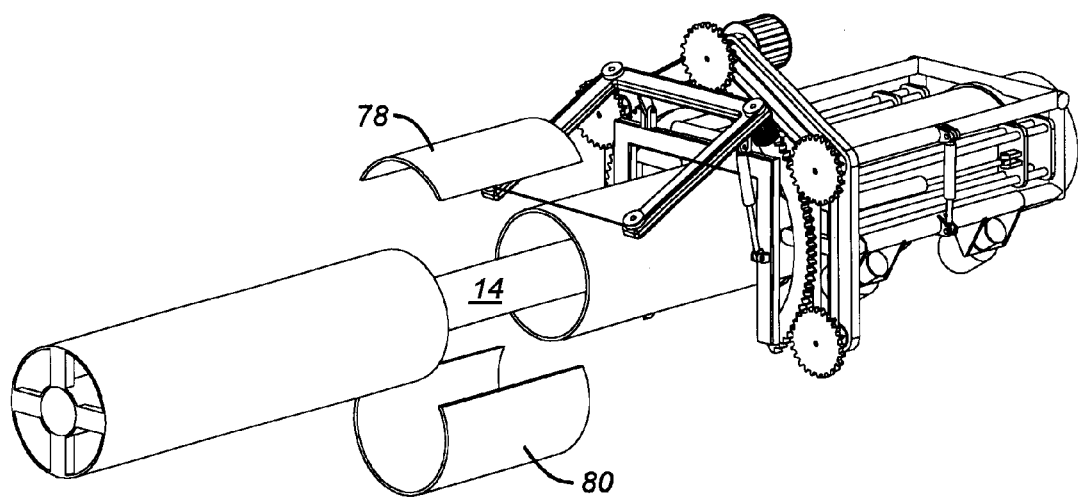
FIG. 11 shows that the two sections of the jacket can be removed while the underlying pipeline remains uncut.

Referring to FIGS. 7 and 8, it can be seen that the base frame 10 has shifted through the operation of rollers 20 away from the original cut 72. A longitudinal cut 74 is made with the wire 56 driven by motor 54, while the sub frame 28 is telescoped into the base frame 10. Gear 36 is not rotated to make this cut straight. If an undulating cut is desired, then gear 36 can be rotated back and forth as the sub frame 28 is retracted into base frame 10. FIGS. 9 and 10 illustrate the completion of cut 74 and the initiation of cut 76 which can be parallel to cut 72. The wire 56 is shown in FIG. 10 as being pulled up and out of the outer jacket 18. This occurs at the conclusion of cut 76. Those skilled in the art will appreciate that at the conclusion of longitudinal cut 74, motor 32 is actuated and the process for making cut 76 is a repetition of the process for making cut 72. Cuts 72 and 76 can be identical or they can be different as long as they fully go around and through the outer jacket 18 without penetrating through the pipeline 14. As shown in FIG. 11, at the conclusion of cut 76, the two pieces 78 and 80 can be removed or they can be allowed to fall to the seabed.

The apparatus A can also be used to cut through pipeline 14 by a combination of the telescoping motion between the sub frame 28 and the base frame 10 while pivotal motion occurs with regard to wire cutter frame 52, while at the same time motor 32 is actuated. The cutter frame 52 does not need to be pivotally mounted and can be fixed for movement in a single plane transverse to the longitudinal axis of the pipe 14. It can be combined with the telescoping action of sub frame 28 to obtain cuts that are in more than one plane. The cut made by the apparatus A can go entirely through the pipeline 14. The cut can be in a single plane perpendicular to the longitudinal axis of the pipe 14, or it can have a curve or any other shape because of all the degrees of freedom provided by the various movements described above.

In the preferred embodiment, cuts through the outer jacket 18 or through the pipeline 14 itself are preferably made by opposed motions of approximately 180° in opposite directions so as to avoid entanglement of various hydraulic control lines which are used, for example, to power motor 54. It should be noted that the open gear frame 68 and open gear 36 are guided to prevent their longitudinal movement from sub frame 28. In this manner, the teeth 38 on open gear 36 remain in alignment with the various sprockets 34, 40, 42, 44 and 46.

At the conclusion of the cutting, allowing pieces 78 and 80 to be separated, the underlying pipeline 14 is exposed so that repairs could be accomplished and the exact position of the problem with the pipeline can be pinpointed. The apparatus A can be used to make numerous cuts of different types, either going through the outer jacket 18 or through the pipeline 14 in a to variety of locations. Those skilled in the art will appreciate that the jacketed pipeline 12 is normally on the seabed or somewhat submerged and is necessarily picked up and supported above the seabed prior to lowering the apparatus A onto the segment of the jacket pipeline 12 which is to be cut, either through the jacket 18 or through the pipeline 14.

The foregoing disclosure and description of the invention are illustrative and explanatory thereof, and various changes in the size, shape and materials, as well as in the details of the illustrated construction, may be made without departing from the spirit of the invention.

What is claimed is:

1. An apparatus for cutting a pipe jacket of a pipe or through a pipe, whether jacketed or not, comprising:
   a fame supporting a cutter and mountable over the pipe or pipe and jacket;
   a plurality of positioning mechanisms for the cutter operating in tandem which allow said cutter to cut the jacket off a pipe without cutting the pipe or to selectively cut through the pipe;
   said cutter is rotationally mounted so that it can move around the pipe or pipe and jacket;
   said cutter is movably mounted so that it can moved toward and away from the longitudinal axis of the pipe while being rotated around the pipe;
   a telescoping sub frame movable with respect to said frame and supporting said cutter;
   said cutter moved in the direction of the longitudinal axis of the pipe or pipe and jacket by said sub frame;
   said frame further comprising powered rollers that allow it to be driven away from an initial transverse out in the jacket, said sub frame being extendable so as to leave said cutter stationary despite repositioning of said frame, whereupon said sub frame can advance said cutter for a longitudinal cut of the jacket followed by a second transverse cut so that two jacket pieces are formed for removal from the pipe.

2. The apparatus of claim 1 wherein said sub frame is telescopically mounted to said frame.

3. The apparatus of claim 2, wherein said sub frame supports said cutter for rotation in at least one plane transverse to the longitudinal axis of the pipe.

4. The apparatus of claim 3, wherein said cutter is pivotally mounted on an axis transverse to the longitudinal axis of the pipe to allow arcuate movement toward or away from the pipe or pipe and jacket.

5. An apparatus for cutting a sub sea pipeline jacket having an outer diameter comprising:
   a. a base frame securable over a jacket, said base frame comprising a telescoping sub frame;
   b. a cutter frame pivotally and rotatably mounted to said base frame, said cutter frame comprising a first side and a second side separated by a distance that exceeds the diameter of a jacket to which said base frame is securable;
   c. a wire cutter having a first end region attached to said first side and a second end region attached to said second side, such that said cutter is capable of cutting across the outer diameter of a jacket to which said base frame is securable;
   d. a positioning mechanism to control the advancement of said cutter toward or away from a jacket to which said frame is securable, such that said cutter can be moved in as many as three simultaneous directions, said directions being the longitudinal axis of a jacket to which said base frame is securable, toward or away from a jacket to which said base frame is securable, and around a jacket to which said base frame is securable; and
   e. a clamping and crawling mechanism attached to said base frame, said mechanism capable of clamping said sub frame to a jacket, and said mechanism further comprising at least two rollers capable of allowing said entire base frame and sub frame to crawl along a jacket to which said base frame is securable.

6. The apparatus of claim 5 wherein said cutter is a diamond wire cutter.

7. The apparatus of claim 5 wherein said cutter frame comprises:
   a. first pulley mounted on said first side;
   b. a second pulley mounted on said second side;
   c. a drive motor coupled to said pulleys to cause rotational movement of said pulleys; and
   d. wherein said cutter is secured to said pulleys such that when said pulleys rotate, said cutter moves in a cutting motion.

8. The apparatus of claim 5 wherein said cutter frame comprises:
   a. a first pair of pulleys mounted on said first side;
   b. a second pair of pulleys mounted on said second side;
   c. a drive motor coupled to said first and second pair of pulleys to cause rotational movement of said pulleys; and
   d. wherein said cutter is secured to said pulleys such that when said pulleys rotate, said cutter moves in a cutting motion.

9. The apparatus of claim 5, wherein said cutter frame comprises a gear having an open lower end and wherein said sub frame comprises at least one meshing gear for rotational movement of said cutter about the longitudinal axis of a jacket to which said apparatus frame is securable.

10. The apparatus of claim 5, further comprising a plurality of positioning mechanisms for said cutter which are capable of operating in tandem to allow said cutter to cut the jacket of a pipe without cutting the pipe.

11. An apparatus for cutting a sub sea pipeline jacket having an outer diameter or a pipe comprising:

a. a base frame securable over a jacket or a pipe, said base frame comprising a telescoping sub frame;
b. a cutter frame pivotally and rotatably mounted to said base frame, said cutter frame comprising a first side and a second side separated by a distance that exceeds the diameter of a jacket or a pipe to which said base frame is securable;
c. a diamond wire cutter having a first end region attached to said first side and a second end region attached to said second side, such that said cutter is capable of cutting across the outer diameter of a jacket or a pipe to which said base frame is securable;
d. a positioning mechanism to control the advancement of said cutter toward or away from a jacket to which said frame is securable, such that said cutter can be moved in as many as three simultaneous directions, said directions being the longitudinal axis of a jacket or pipe to which said base frame is securable, toward or away from a jacket or pipe to which said base frame is securable, and around a jacket or pipe to which said base frame is securable; and
e. a clamping and crawling mechanism attached to said base frame, said mechanism capable of clamping said sub frame to a jacket or pipe, and said mechanism further comprising at least two rollers capable of allowing said entire base frame and sub frame to crawl along a jacket or pipe to which said base frame is securable.

12. The apparatus of claim 11, wherein said sub frame comprises a motor driven sprocket assembly that allows rotation of said cutter frame around a jacket or pipe to which said apparatus frame is securable.

13. The apparatus of claim 11, further comprising a plurality of positioning mechanisms for said cutter which are capable of operating in tandem to allow said cutter to cut the jacket of a pipe without cutting the pipe.

* * * * *

UNITED STATES PATENT AND TRADEMARK OFFICE
CERTIFICATE OF CORRECTION

PATENT NO. : 6,267,037 B1
DATED : July 31, 2001
INVENTOR(S) : Richard W. McCoy, Jr., Luis J. Gutierrez It is certified that error appears in the above-identified patent and that said Letters Patent is hereby corrected as shown below:

Column 5,
Line 47, delete "moved", and insert -- move --.

Signed and Sealed this

Eleventh Day of December, 2001

Attest:

NICHOLAS P. GODICI
Attesting Officer
*Acting Director of the United States Patent and Trademark Office*